US008582125B2

(12) United States Patent
Ruhe et al.

(10) Patent No.: US 8,582,125 B2
(45) Date of Patent: Nov. 12, 2013

(54) VARIABLE SUPPORT STRUCTURE AND MEDIA SHEET SEPARATOR

(75) Inventors: Tom Ruhe, La Center, WA (US); Jiangxiao Mo, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2439 days.

(21) Appl. No.: 10/624,305

(22) Filed: Jul. 22, 2003

(65) Prior Publication Data

US 2005/0018215 A1 Jan. 27, 2005

(51) Int. Cl.
*G06F 15/00* (2006.01)

(52) U.S. Cl.
USPC ........... 358/1.12; 358/1.6; 271/110; 271/121; 271/124

(58) Field of Classification Search
USPC .......... 358/1.6, 1.12; 271/121, 118, 117, 114, 271/124, 125, 110, 161; 156/247; 400/616.2, 196.1
See application file for complete search history.

(56) References Cited

U.S. PATENT DOCUMENTS 4,648,930 A * 3/1987 La Mers ........................ 156/247
4,787,764 A * 11/1988 Ikeda et al. ................ 400/616.2
5,226,740 A * 7/1993 Kodama ..................... 400/196.1
5,269,506 A * 12/1993 Olson et al. ................... 271/121
5,655,762 A * 8/1997 Yergenson .................... 271/121
5,711,517 A * 1/1998 Kelly ........................... 271/4.01
5,895,040 A * 4/1999 Oleksa et al. ................. 271/124
5,971,390 A * 10/1999 Caspar et al. ................. 271/121
6,027,111 A * 2/2000 Rubscha et al. .............. 271/123
6,042,103 A * 3/2000 Yraceburu et al. ........... 271/118
6,158,909 A * 12/2000 McCue et al. ................ 400/582
6,227,534 B1 * 5/2001 Schoedinger et al. ........ 271/114
6,257,569 B1 * 7/2001 Rhodes et al. ................ 271/117
6,536,757 B2 * 3/2003 Chang ............................. 271/16
6,748,191 B2 * 6/2004 Yamamoto et al. ........... 399/323

* cited by examiner

*Primary Examiner* — Allen H Nguyen
(74) *Attorney, Agent, or Firm* — Steven R. Ormiston

(57) ABSTRACT

In one embodiment, a structure comprises a pliable sheet and first and second stationary supports extending along and supporting the sheet. The supports are oriented relative to one another such that a distance between the supports at one part of the sheet is greater than a distance between the supports at another part of the sheet. In another embodiment, a sheet media input structure comprises a sheet media supporting surface and a media sheet separator downstream from the supporting surface along a media path that extends from the supporting surface to and along the separator. The separator is configured to separate a top sheet on the stack from a next-to-top sheet in the stack by resisting the movement of sheets along the media path and the degree of resistance varies along the length of the separator.

4 Claims, 11 Drawing Sheets

VARIABLE SUPPORT STRUCTURE AND MEDIA SHEET SEPARATOR

FIELD OF THE INVENTION

The invention relates generally to a variable support structure and, more particularly but without limiting the invention, to an input structure for printers and other sheet media processing devices.

BACKGROUND

In many printers, individual sheets of paper or other print media are fed into the printer off the top of a stack of sheets held in a tray. Typically, a pick roller is rotated against the top sheet to slide the top sheet off the stack and into a set of rollers that feed the sheet into the print engine. The friction between sheets in the stack sometimes causes the top two or three sheets in the stack to stick together as the top sheet is picked from the stack. The next-to-top sheets must be separated from the top sheet to avoid feeding multiple sheets into the print engine at the same time.

In one conventional input structure, the next-to-top sheets are separated from the top sheet by driving the sheets against an angled wall positioned at the front of the media input tray. This separation wall also functions as a load stop to prevent the user from pushing media too far into the printer when a media stack is loaded into the tray. Since the wall is angled, however, it is comparatively easy for the user to push the stack partially up the separation wall and too far into the printer, which prevents effective sheet separation.

In some printers, an elastomeric pad is embedded in the separation wall to make it more difficult for a user to load the media stack too far into the printer. The compressibility and high surface friction of the pad create a desirable increase in the resistance to the media stack during loading. Unfortunately, a uniform pad that creates enough resistance to function as an effective load stop can also create too much resistance to the top sheet picked from the stack and pushed up the separation wall along the pad.

DRAWINGS

DESCRIPTION

Embodiments of the invention were developed in an effort to balance the need for a higher resistance load stop with the need for a lower resistance while a sheet is picked. Exemplary embodiments of the invention will be described with reference to the inkjet printer shown in FIGS. 1 and 2. The invention, however, is not limited to use with printers or inkjet printers. More generic embodiments of the invention, such as those shown in FIGS. 24-26, may be used in any environment in which it is necessary or desirable to vary the resistance along a pliable sheet. Other more specific embodiments of the invention, such as those shown in FIGS. 16-23, may be implemented in any printer or other sheet media processing device in which it is necessary or desirable to balance the need for a higher resistance load stop with the need for a lower resistance sheet-picking feature. It is expected that various embodiments of the invention will be particularly useful in printers with a U-shaped media path typical of many inkjet printers in which the print media is fed at a steep angle from a horizontal tray.

Figure 1:
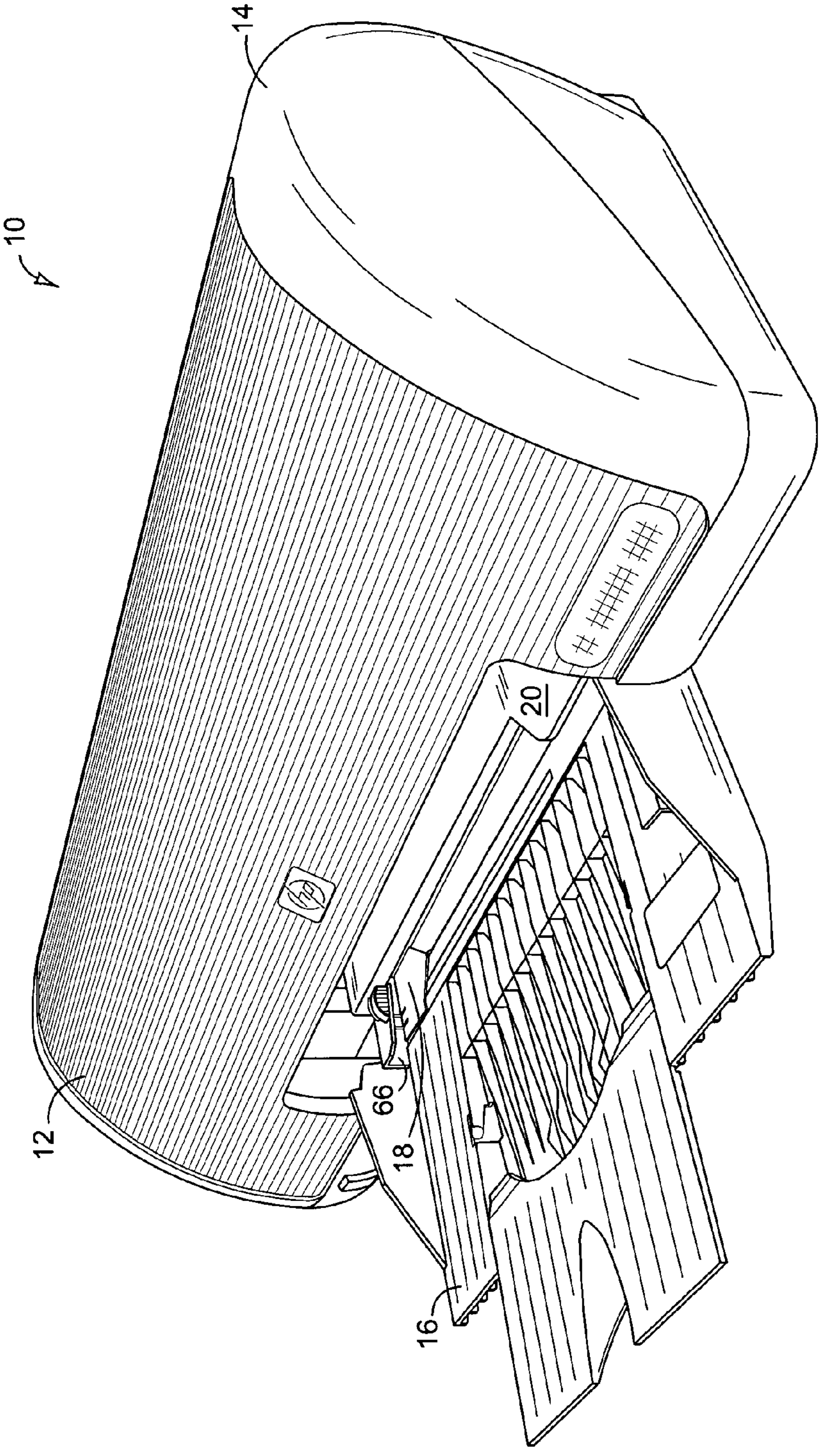
FIG. 1 is a perspective view of an inkjet printer.
Figure 2:
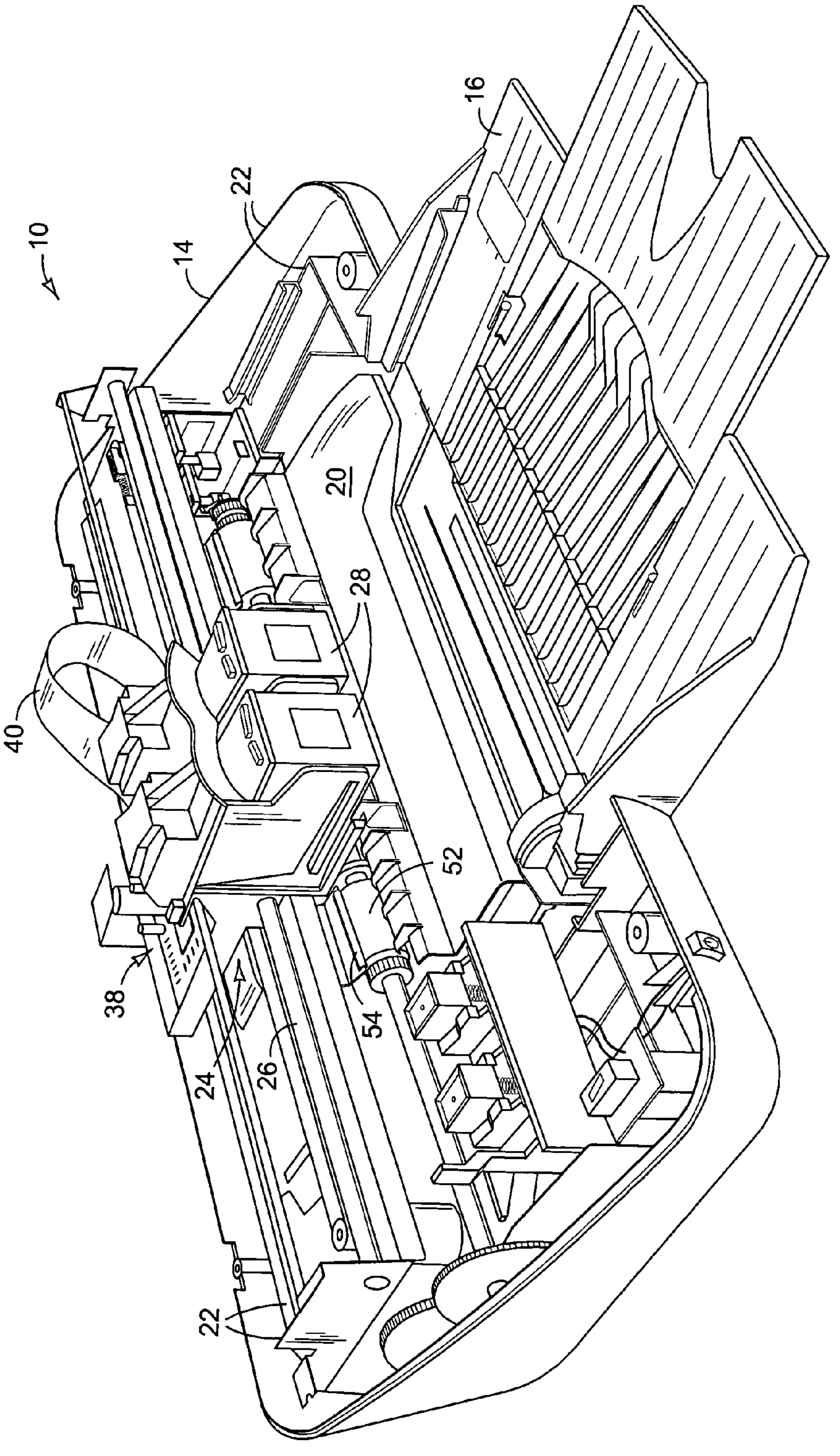
FIG. 2 is a perspective view of an inkjet printer such as the one shown in FIG. 1 with the cover and other parts of the housing removed.
Figure 3:
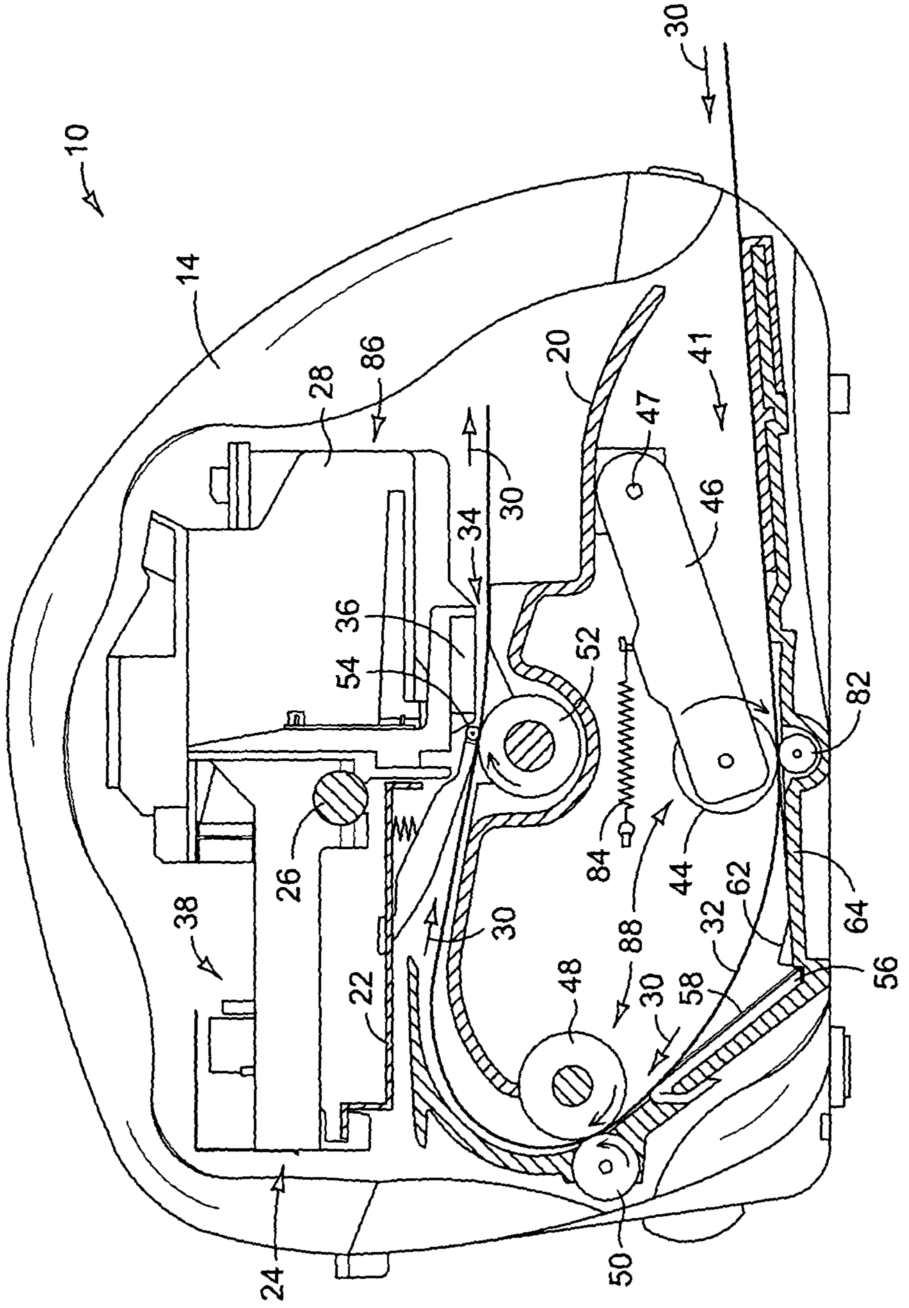
FIG. 3 is a side elevation and partial section view of an inkjet printer such as the one shown in FIG. 2.

FIG. 1 illustrates an inkjet printer 10. FIG. 2 shows inkjet printer 10 with cover 12 and other parts of housing 14 removed. FIG. 3 is a side elevation and partial section view of an inkjet printer 10 such as the one shown in FIGS. 1 and 2. Referring to FIGS. 1-3, printer 10 includes a cover 12 and a housing 14. A sheet media tray 16 is positioned at the bottom of printer 10 along an opening 18 in housing 14. Paper or other print media sheets 32 are stacked in tray 16 for input to printer 10 and printed sheets are output back through opening 18 over tray 16. A supporting surface 20 helps suspend the trailing edge of the printed sheets over tray 16. Printer 10 includes a chassis 22 that supports the operative components of printer 10. Chassis 22 represents generally those parts of housing 14 along with other structurally stable elements in printer 10 that support the operative components of printer 10. A printhead carriage 24 is driven back and forth along a guide rail 26 mounted to chassis 22. Any suitable drive mechanism may be used to move carriage 24. A reversing motor (not shown) coupled to carriage 24 through a belt and pulley system (not shown), for example, is one carriage drive mechanism commonly used in inkjet printers.

Carriage 24 has stalls for holding one or more printheads 28. In the printer shown in FIGS. 1-3, carriage 24 carries two printheads 28—one printhead containing color ink for color printing and one printhead containing black ink for monochrome printing. Printheads 28 are also commonly referred to as print cartridges or ink cartridges. As best seen in FIG. 3, printheads 28 are positioned along media path 30 such that each sheet of print media 32 passes directly under printheads 28 at print zone 34. The bottom 36 of each printhead 28, which faces media sheet 32, includes an array of nozzles through which drops of ink are ejected onto media sheet 32.

An electronic printer controller 38 receives print data from a computer, scanner, digital camera or other image generating device. Controller 38 controls the movement of carriage 24 back and forth across media sheet 32 and the advance of media sheet 32 along media path 30. Printer controller 38 is also electrically connected to printheads 28 through, for example, a flexible ribbon cable 40. As carriage 24 carries printheads 28 across media sheet 32, printer controller 38 selectively activates ink ejection elements in printheads 28 according to the print data to eject ink drops through the nozzles onto media sheet 32. By combining the movement of carriage 24 across media sheet 32 with the movement of sheet 32 along media path 30, controller 38 causes printheads 28 to eject ink onto media sheet 32 to form the desired print image.

Figure 4:
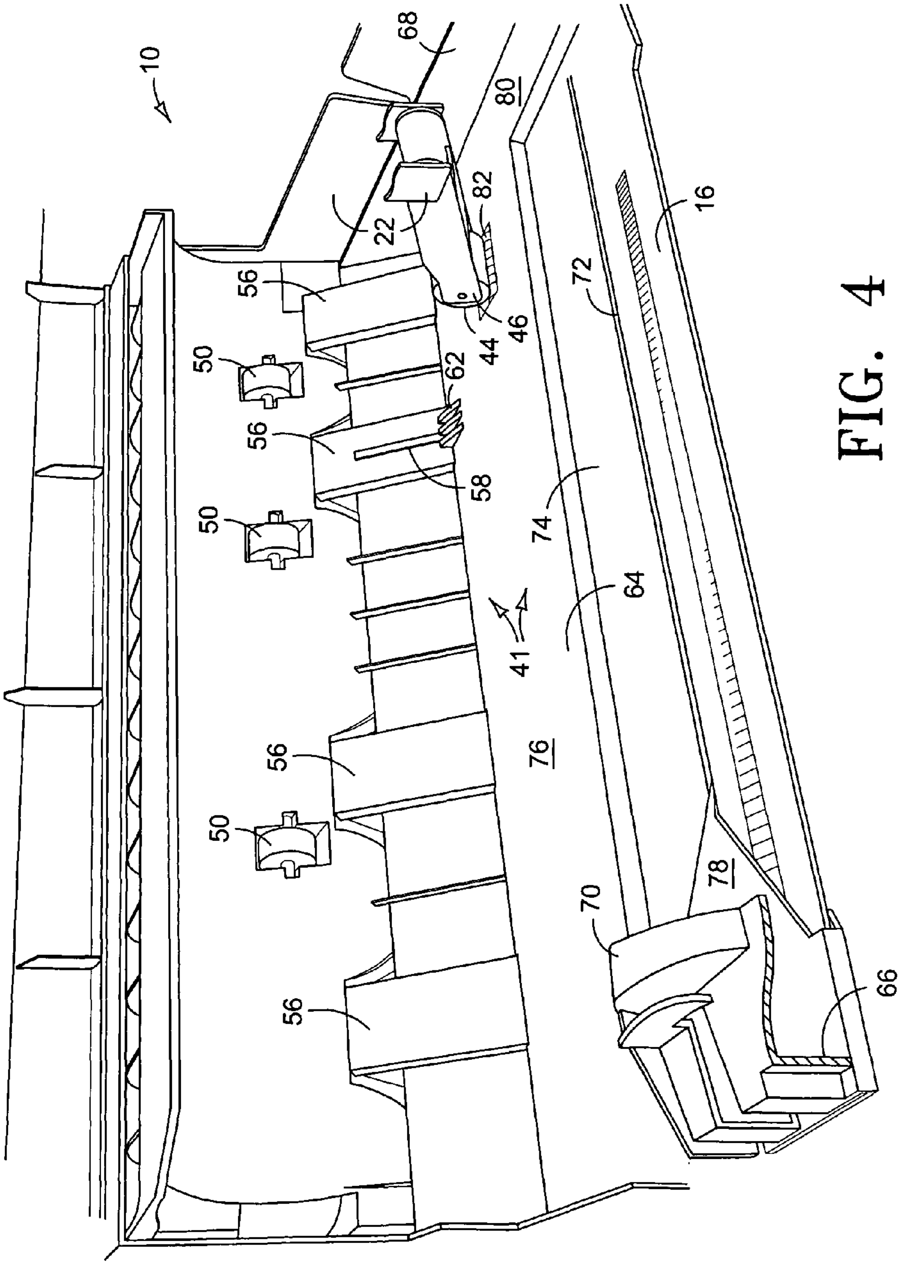
FIGS. 4 and 5 are, respectively, perspective and side elevation views showing in more detail the media input structure of the printer of FIG. 3.
Figure 5:
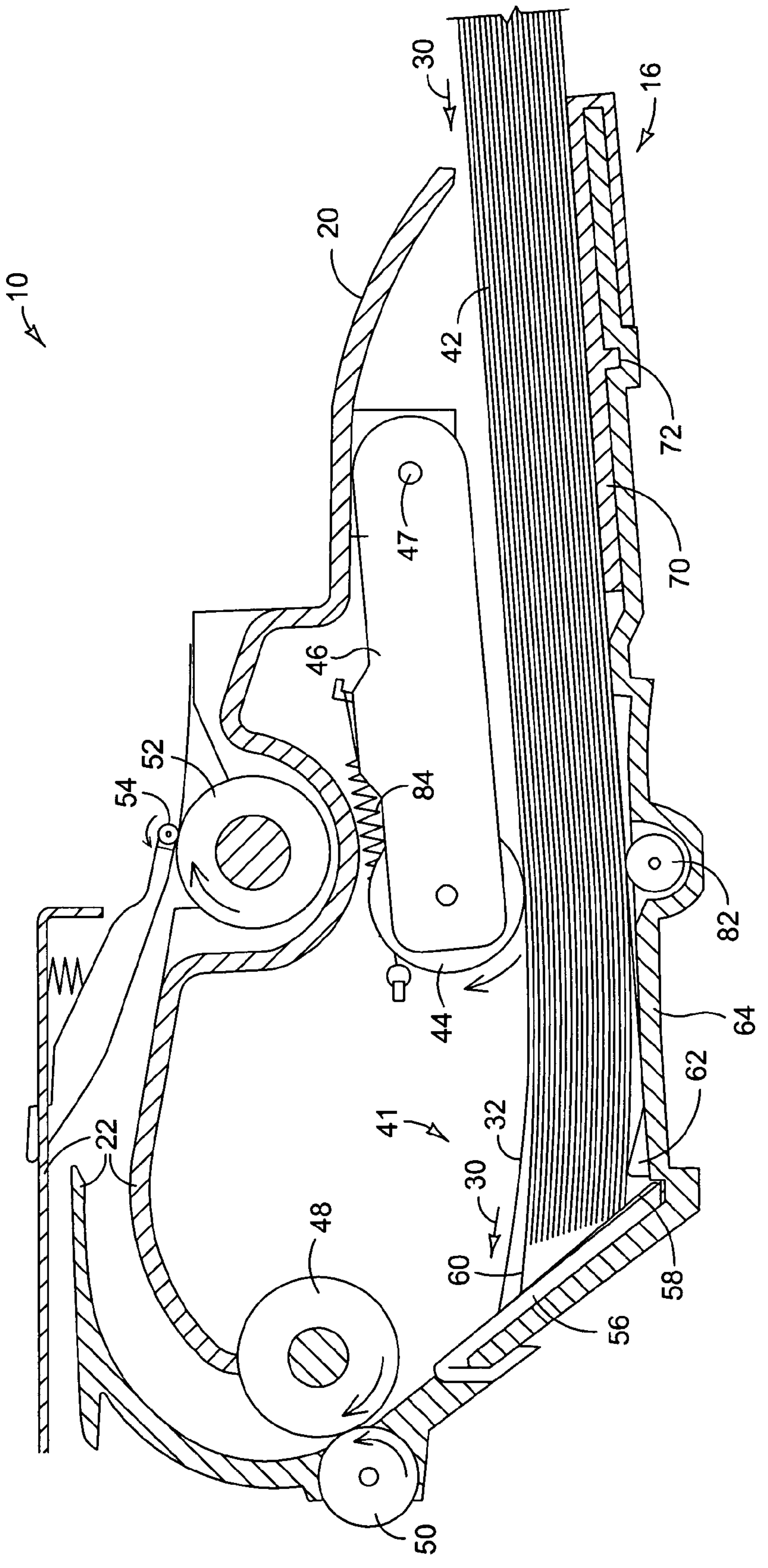

FIG. 4 is a perspective view of an input structure 41 and components of the media sheet pick mechanism. FIG. 5 is a side elevation and partial section view showing input structure 41 and pick/feed mechanism components along media path 30. FIG. 5 shows a stack 42 of media sheets in tray 16 and a top sheet 32 being fed along media path 30. Referring to FIGS. 4 and 5, top sheet 32 is "picked" from a stack 42 of media sheets in tray 16 and fed along media path 30. A pick roller 44, mounted on a pick roller swing arm 46, rests on top sheet 32. When a sheet is needed for printing, pick roller 44 is driven clockwise at the direction of controller 38 to grab top sheet 32 and feed it along media path 30 toward transport roller 48. Transport roller 48 bears against idler roller 50 to form a nip that moves sheet 32 along toward output roller 52. Output roller 52 bears against idler arm 54 to form a nip that moves sheet 32 onto sheet output supporting surface 20.

Each sheet 32 is guided from tray 16 toward transport roller 48 along guide ramps 56. Guide ramps 56 also function as angled separation walls that help prevent any next-to-top sheets carried along with top sheet 32 from moving into the transport roller nip. One or more separator pads 58 are used to improve sheet separation and to more effectively block a stack 42 from being loaded too far into printer 10. Separator pad 58 represents generally any comparatively soft structural feature that protrudes from the face of wall 56 or otherwise extends into media path 30 between tray 16 and transport roller 48 that is configured to help separate next-to-top sheets carried along with top sheet 32 from moving into the transport roller nip. Separator pad 58 is typically constructed as an elastomeric strip that protrudes from the face of wall 56. The force of pick roller 44 on top sheet 32 is sufficient to overcome the resistance of separator pad 58 while the next-to-top sheet 60, which is dragged along with only a much smaller sheet-to-sheet friction force, will be stopped by pad 58. That is to say, pad 58 separates next-to-top sheet 60 from top sheet 32. A stack ramp 62 is also sometimes provided to elevate the leading edge of sheets in the stack 42 to reduce the force needed to feed top sheet 32 past separator pad 58.

Media tray 16 includes a base panel 64 extending between sidewalls 66 and 68. Media tray 16 typically includes a mechanism to adjust the width of the tray to accommodate different width media. In the printer 10 illustrated in the figures, left sidewall 66 is integral to a slider 70 that slides along a slot 72 in a recess 74 in base panel 64 to adjust for differing width media. Base panel 64 and slider 70 define media support surfaces 76, 78 and 80.

Pick roller swing arm 46 is mounted to chassis 22 at a swing arm pivot 47 located upstream and above pick roller 44 such that pick roller 44 swings down counter-clockwise against stack 42. An idler roller 82 is recessed into base panel 64 directly below pick roller 44. When tray 16 is empty, pick roller 44 rests on idler roller 82. In the event pick roller 44 is activated when tray 16 is empty, pick roller 44 will turn on idler roller 82 and, therefore, avoid any damage to pick roller 44 or other pick mechanism components. A biasing spring 84 urges pick roller swing arm 46 down to maintain contact between pick roller 44 and top sheet 32 in stack 42.

Carriage 24 and printheads 28 along with other hardware components necessary to deliver ink to the print media are referred to collectively as print engine 86 (FIG. 3). Rollers 44/82, 48/50 and 52/54 along with other hardware components necessary to transport the print media through printer 10 are referred to collectively as pick/feed mechanism 88 (FIG. 3). Controller 38 includes the programming, processor and associated memory and electronic circuitry necessary to control print engine 86, pick/feed mechanism 88, and the other operative components of printer 10.

Figure 7:
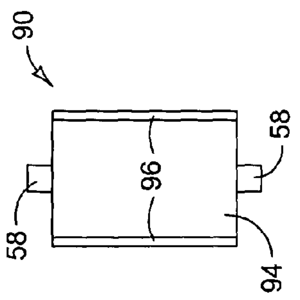
FIGS. 6-8 are front elevation, rear elevation and plan views, respectively, showing a separator assembly that includes separator pad.
Figure 6:
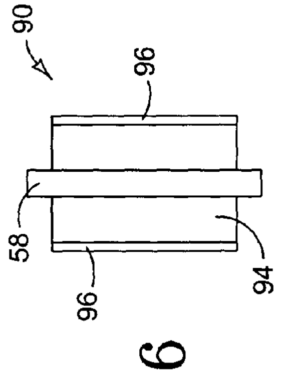
Figure 8:
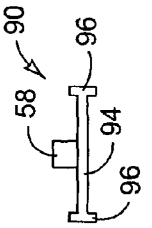
Figure 11:
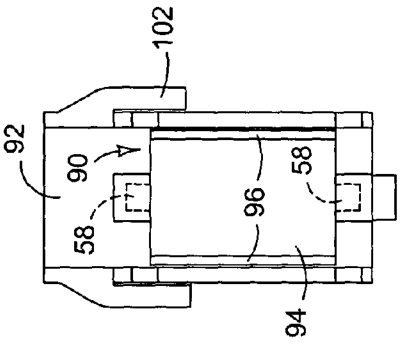
FIGS. 9-11 are front, side and rear elevation views, respectively, showing a separator assembly and housing.
Figure 10:
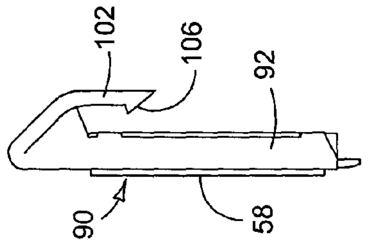
Figure 9:
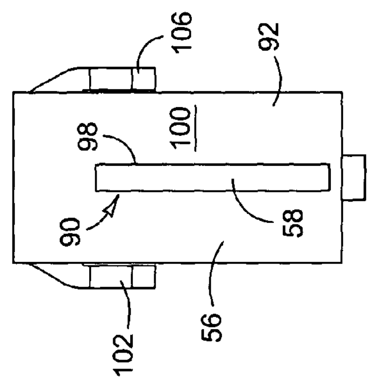
Figure 12:
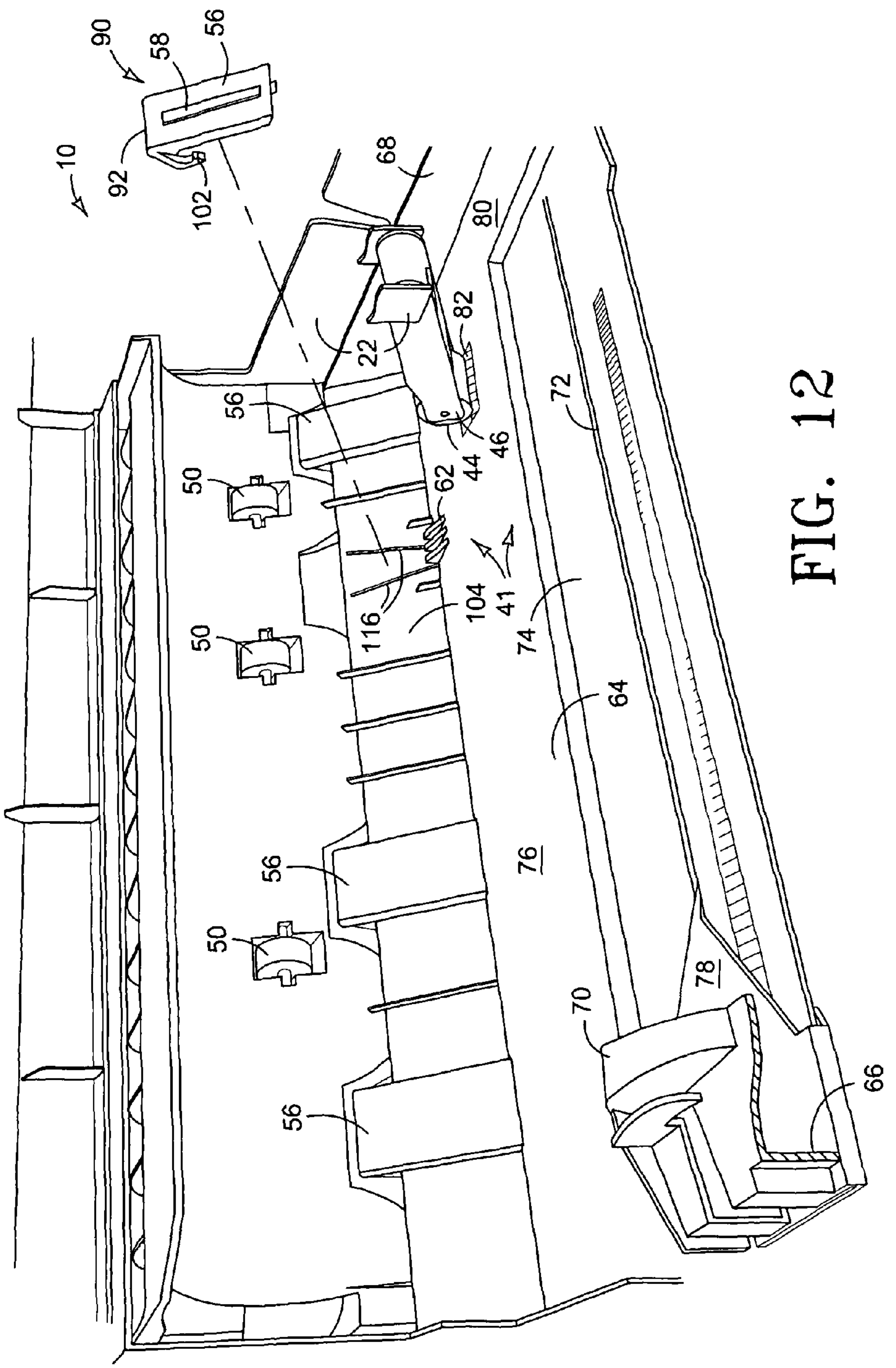
FIG. 12 is a perspective partially exploded view showing the attachment of the separator assembly and housing of FIGS. 9-11 to a printer chassis.
Figure 13:
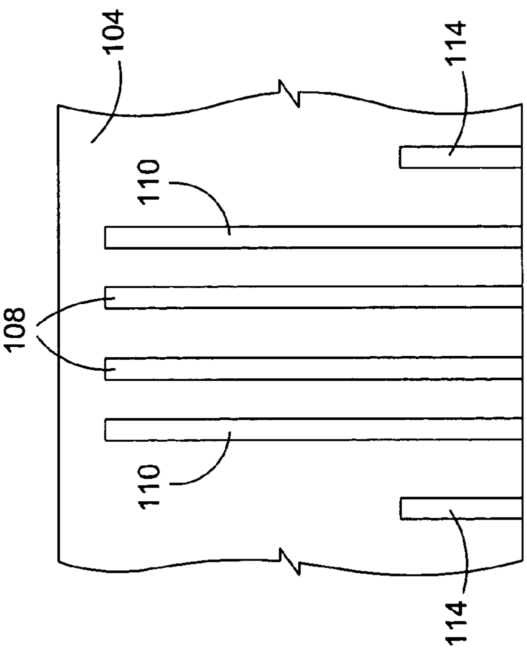
FIG. 13 (Prior Art)
FIGS. 13-15 illustrate a conventional structure for supporting a separator assembly.
Figure 14:
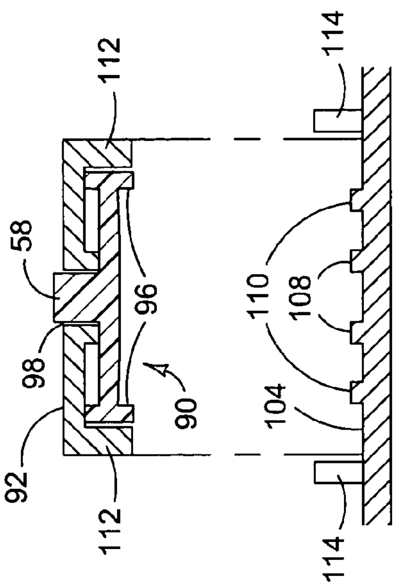
FIG. 14 (Prior Art)
Figure 15:
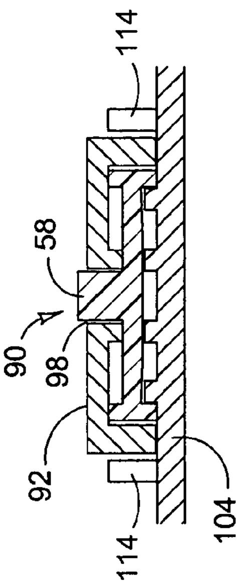
FIG. 15 (Prior Art)

FIGS. 6-8 are front elevation, rear elevation and plan views, respectively, showing a separator assembly 90 that includes separator pad 58. FIGS. 9-11 are front, side and rear elevation views, respectively, showing separator assembly 90 housed in a housing 92 that also forms a guide ramp 56. FIG. 12 is a perspective partially exploded view showing the attachment of the separator assembly 90 and housing 92 to chassis 12. FIGS. 13-15 illustrate a conventional structure for supporting separator assembly 90. FIGS. 16-23 illustrate new structures for supporting separator assembly 90 according to various embodiments of the invention.

Referring first to FIGS. 6-8, separator assembly 90 includes separator pad 58 attached to or integral with a pliable sheet 94. In the embodiment shown in the figures, separator pad 58 may be constructed as an elongated elastomeric or other suitably pliable strip. Sheet 94 extends between a pair of flanges 96 positioned along opposite edges of sheet 94. Pad 58 extends across the middle of sheet 94 parallel to flanges 96. Pad 84, sheet 94 and flanges 92 may be constructed of an elastomer and may be molded as a single unit or constructed as separate parts attached to one another. Referring now also to FIGS. 9-12, separator assembly 90 is held in place by housing 92. Pad 58 protrudes from sheet 94 through a slot 98 in face 100 of housing 92. Face 100 forms a guide ramp 56 on either side and adjacent to pad 58. A pair of barbed mounting hooks 102 are formed at the rear of housing 92. As shown in FIG. 12, housing 92 with separator assembly 90 is attached to sloped wall 104, a component of chassis 22, by placing pad 58 through slot 98 and sliding hooks 102 over wall 104 so that pad 58 faces away from wall 104 and sheet 94 is captured between wall 104 and housing 92. Barbs 106 engage a feature (not shown) on the rear of wall 104 to help hold housing 92 in place on wall 104.

In a conventional structure for supporting separator assembly 90, shown in FIGS. 13-15, parallel support ridges 108 extend along wall 104 behind separator assembly 90. Ridges 108 support sheet 94 on either side of pad 58. Flanges 96 on separator assembly 90 are secured between side ridges 110 on wall 104 and sidewalls 112 on housing 92, as best seen in FIG. 15. A pair of shorter ridges 114 on wall 104 help properly position housing 92 along wall 104 and provide lateral support for housing 92. Parallel ridges 108 support sheet 94 uniformly along the length of pad 58 and, therefore, the resistance of pad 58 to the movement of sheets fed from stack 42 as shown in FIGS. 3 and 5 is constant. That is to say, pad 58 resists the movement of top sheet 32 fed from a full stack 42 to the same degree that it blocks stack 42 as it is loaded into tray 16.

Separator pad 58 performs two functions—(1) separating the next to top sheet from the top sheet while feeding media during normal operation and (2) preventing the user from loading the media stack too far into the printer. Separating sheets requires a lower resistance to the movement of sheets fed past separator 58. In contrast, preventing the user from loading the media stack too far into the printer requires a higher resistance. As best seen in FIG. 5, due to the angle of guide ramp 56 and separator pad 58, most stacks 42 are effectively blocked during loading by contact with the sheets at the bottom of the stack 42. Realizing this, the structure supporting separator assembly 90 was redesigned to offer a resistance that varies from a higher resistance at the bottom to a lower resistance at the top.

Figure 18:
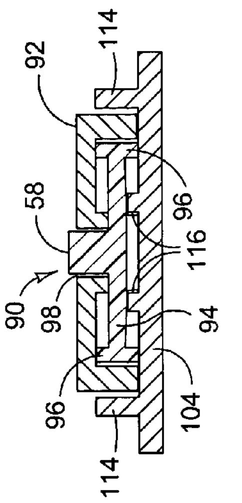
FIGS. 16-23 illustrate structures for supporting a separator assembly according to various embodiments of the invention.
Figure 19:
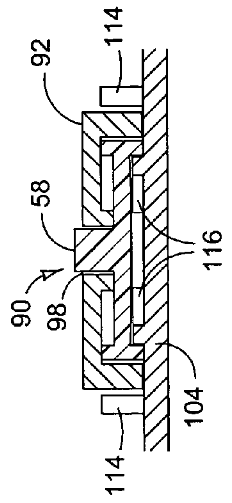
Figure 16:
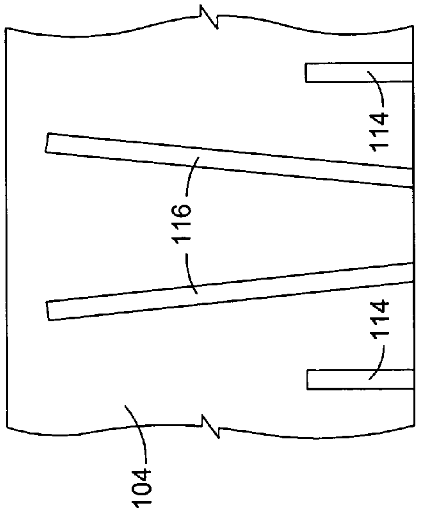
Figure 17:
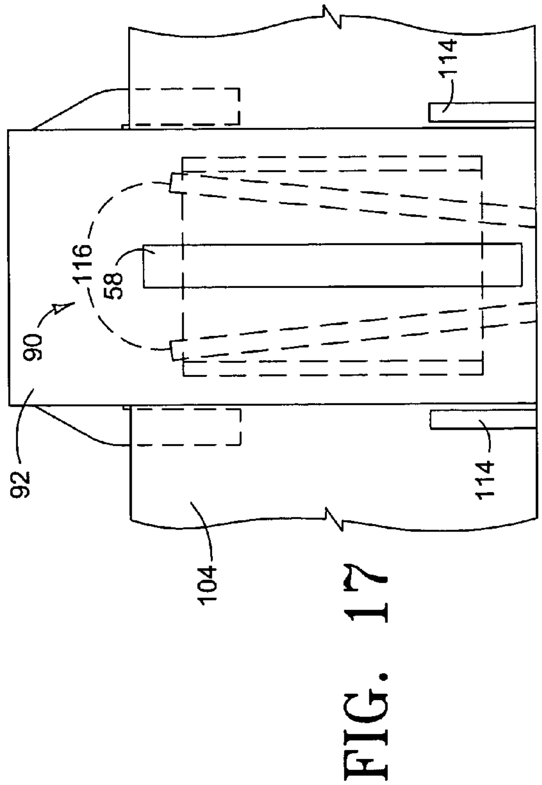

In a first embodiment of the invention, shown in FIGS. 16-19, support ridges 116 are oriented along wall 104 in a generally V shaped configuration such that the spacing between the ridges is smaller at the bottom of separator assembly 90 than at the top. (Support ridges 116 are also shown in the perspective view of FIG. 12.) The section view of FIG. 18 shows the smaller spacing of ridges 116 at the bottom of separator assembly 90. The section view of FIG. 19 shows the larger spacing at the top of separator assembly 90. Ridges 116 support sheet 94 on either side of pad 58. Flanges 96 are secured at the top of separator assembly 90 between side ridges 116 on wall 104 and sidewalls 112 on housing 92, as best seen in FIG. 19. Shorter ridges 114 on wall 104 help properly position housing 92 along wall 104 and provide lateral support for housing 92.

The resistance of separator pad 58 to a displacement force, such as the force exerted by loading stack 42 or feeding sheets from stack 42 (see FIG. 5), depends on the spacing of ridges 116. A constant force will displace separator pad 58 more where ridges 116 are farther apart, at a downstream part of pad 58, (FIG. 19), than when ridges 116 are closer together, at an upstream part of pad 58 (FIG. 18). Hence, pad 58 resists the movement of media sheets more at the bottom, upstream part where the displacement force, due to loading a stack, is greater than at the top, downstream part where the displacement force, due only to sheet separation, is smaller.

Figure 20:
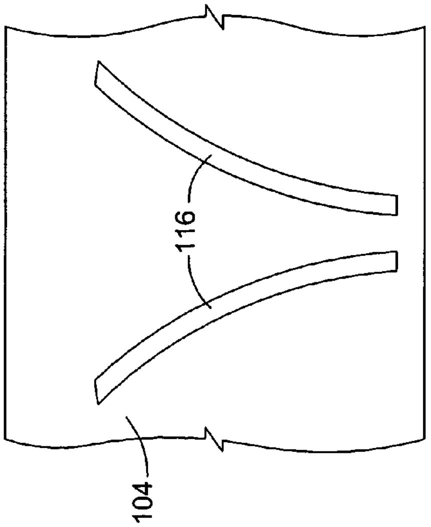
Figure 21:
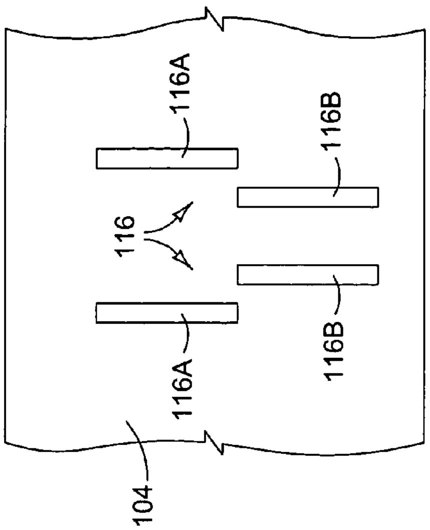
Figure 22:
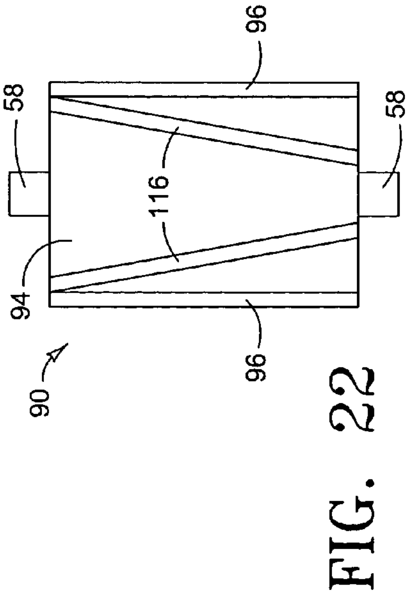
Figure 23:
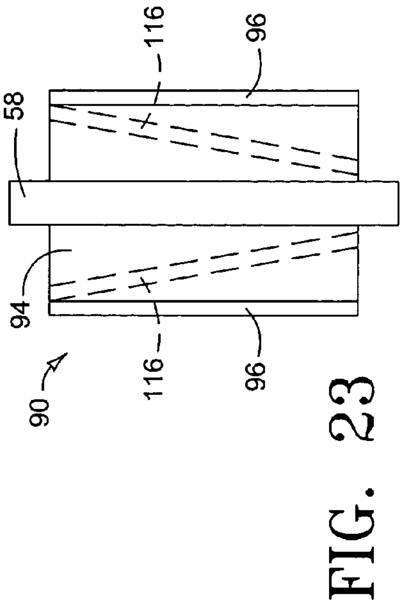

In an alternative embodiment shown in FIG. 20, support ridges 116 are curved. Curved ridges 116 may be used to tailor the resistance profile along the long axis of pad 58. In an alternative embodiment shown in FIG. 21, support ridges 116 are formed as discontinuous segments 116A and 116B that present a stepped resistance profile. In an alternative embodiment shown in FIGS. 22 and 23, ribs 116 are formed along sheet 94 as an integral part of separator assembly 90, and not on wall 104.

Figure 24:
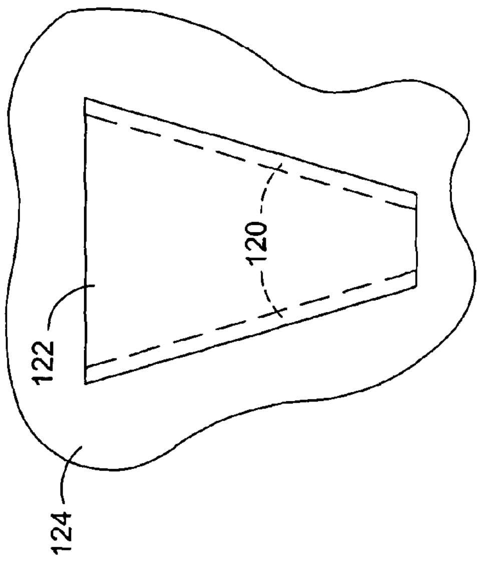
FIGS. 24-26 illustrate variable resistance pliable sheet structures according to other embodiments of the invention.
Figure 25:
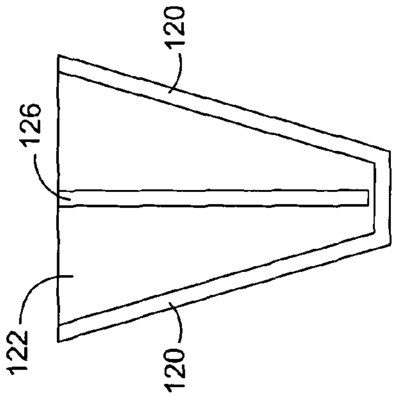
Figure 26:
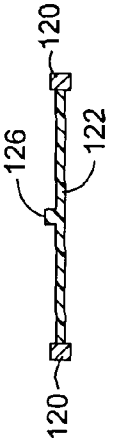

FIGS. 24-26 illustrate a more generic structure suitable for use in any environment in which it is necessary or desirable to vary the resistance along a pliable sheet. In the embodiment shown in FIG. 24, stationary V shaped supports 120 are formed separately from sheet 122 along a frame 124 or other suitable structurally stable feature. While it is expected that, for most applications, rigid supports 120 will be used, pliable supports 120 could also be used to provide a greater degree of variable in the resistance of sheet 122 to normal forces. In the embodiment shown in FIGS. 25 and 26, a pliable strip 124 is formed along sheet 122 between supports 120.

The exemplary embodiments shown in the figures and described above illustrate but do not limit the invention. Other forms, details, and embodiments may be made and implemented. Hence, the foregoing description should not be construed to limit the spirit and scope of the invention, which is defined in the following claims.

What is claimed is:

1. A sheet media input structure for a sheet media processing device, comprising:

a sheet media supporting surface; and a media sheet separator downstream from the supporting surface along a media path that extends from the supporting surface to and along the separator, the separator configured to separate a top sheet on the stack from a next-to-top sheet in the stack by resisting the movement of sheets along the media path the separator comprising:

a pliable sheet spanning first and second supports that extend along and support the sheet; and a protrusion extending along and protruding from the sheet between the supports;

the supports oriented relative to one another such that a distance between the supports at a downstream part of the separator is greater than a distance between the supports at an upstream part of the separator such that the degree of resistance of the separator to the movement of sheets along the media path varies along the length of the separator from a greater resistance at the upstream part of the separator to a lesser resistance at the downstream part of the separator.

2. A sheet media input structure for a sheet media processing device, comprising:

a sheet media supporting surface; and a media sheet separator downstream from the supporting surface along a media path that extends from the supporting surface to and along the separator, the separator configured to separate a top sheet on the stack from a next-to-top sheet in the stack by resisting the movement of sheets along the media path, the separator comprising:

a span of flexible material;

a pair of elongated supports supporting the span; and an elastomeric pad affixed to or integral with the flexible material between the supports;

the supports oriented relative to one another in a generally V shaped configuration in which a distance between the supports at a first part of the span is greater than a distance between the supports at a second part of the span such that the degree of resistance of the separator to the movement of sheets along the media path varies along the length of the separator from a greater resistance at an upstream part of the separator to a lesser resistance at a downstream part of the separator.

3. The structure of claim 2, wherein the second part of the span is upstream along the media path from the first part of the span.

4. The structure of claim 3, wherein the pad is oriented at an obtuse angle relative to the supporting surface.

* * * * *